(12) United States Patent
Hirohata et al.

(10) Patent No.: US 11,346,695 B2
(45) Date of Patent: May 31, 2022

(54) PHYSICAL QUANTITY DETECTION DEVICE

(71) Applicant: Hitachi Astemo, Ltd., Hitachinaka (JP)

(72) Inventors: Shigeto Hirohata, Hitachinaka (JP);
Akira Uenodan, Hitachinaka (JP);
Nobuaki Gorai, Hitachinaka (JP);
Takahiro Miki, Hitachinaka (JP);
Nozomi Yatsumonji, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/422,249

(22) PCT Filed: Jan. 23, 2020

(86) PCT No.: PCT/JP2020/002249
§ 371 (c)(1),
(2) Date: Jul. 12, 2021

(87) PCT Pub. No.: WO2020/202723
PCT Pub. Date: Oct. 8, 2020

(65) Prior Publication Data
US 2022/0074774 A1 Mar. 10, 2022

(30) Foreign Application Priority Data

Mar. 29, 2019 (JP) .............................. JP2019-068678

(51) Int. Cl.
| *G01F 1/684* | (2006.01) |
|---|---|
| *G01F 15/14* | (2006.01) |

(Continued)

(52) U.S. Cl.
CPC .............. *G01F 1/684* (2013.01); *G01F 15/14* (2013.01); *G01F 15/185* (2013.01); *G01F 15/04* (2013.01)

(58) Field of Classification Search
CPC ........ G01F 1/684; G01F 15/14; G01F 15/185; G01F 15/04
See application file for complete search history.

(56) References Cited

U.S. PATENT DOCUMENTS

| 6,393,907 B1 * | 5/2002 | Yamakawa | ............. G01F 1/698 |
|---|---|---|---|
| | | | 73/204.26 |
| 2003/0087448 A1 | 5/2003 | Abe et al. | |

(Continued)

FOREIGN PATENT DOCUMENTS

| JP | 2003-139593 A | 5/2003 |
|---|---|---|
| JP | 2012-98101 A | 5/2012 |

(Continued)

OTHER PUBLICATIONS

International Search Report (PCT/ISA/210) issued in PCT Application No. PCT/JP2020/002249 dated Apr. 14, 2020 with English translation (four (4) pages).

(Continued)

*Primary Examiner* — Ryan D Walsh
(74) *Attorney, Agent, or Firm* — Crowell & Moring LLP

(57) ABSTRACT

Provided is a physical quantity detection device capable of achieving both rigidity improvement and sealability improvement. A physical quantity detection device (20) of the invention includes a housing (100), a cover (200), a chip package (310), and a flow rate sensor (311) supported by the chip package and arranged in a sub-passage. The housing includes: a first adhesive groove 160A which is an adhesive groove to which an adhesive for bonding the cover is applied, extends along a proximal end of the housing, extends in the protruding direction of the housing from the proximal end of the housing to a position on a more distal end side of the housing than the chip package, and is applied with the first adhesive 401; and a second adhesive groove 160B which extends along the sub-passage 134 and is (Continued)

applied with the second adhesive 402. The first adhesive has a higher Young's modulus, and the second adhesive has a higher thixotropy.

8 Claims, 17 Drawing Sheets

(51) Int. Cl.
*G01F 15/18* (2006.01)
*G01F 15/04* (2006.01)

(56) References Cited

U.S. PATENT DOCUMENTS

| | | |
|---|---|---|
| 2004/0060361 A1 | 4/2004 | Kozawa et al. |
| 2007/0107511 A1 | 5/2007 | Strohrmann et al. |
| 2012/0103107 A1 | 5/2012 | Uramachi et al. |
| 2016/0011029 A1 | 1/2016 | Arai et al. |

FOREIGN PATENT DOCUMENTS

| | | | |
|---|---|---|---|
| JP | 2020112433 A | * | 7/2020 |
| WO | WO 02/066937 A1 | | 8/2002 |
| WO | WO 2014/156268 A1 | | 10/2014 |

OTHER PUBLICATIONS

Japanese-language Written Opinion (PCT/ISA/237) issued in PCT Application No. PCT/JP2020/002249 dated Apr. 14, 2020 (three (3) pages).

* cited by examiner

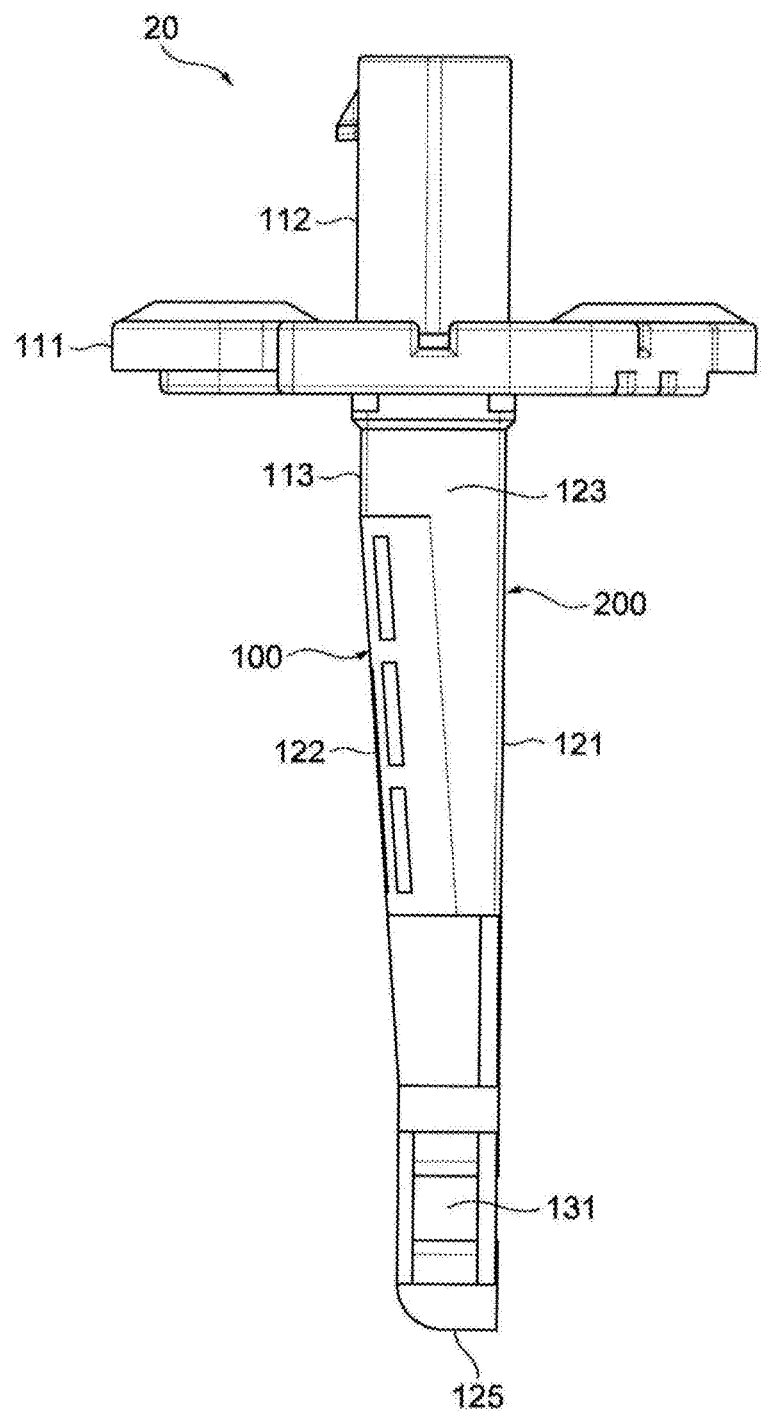

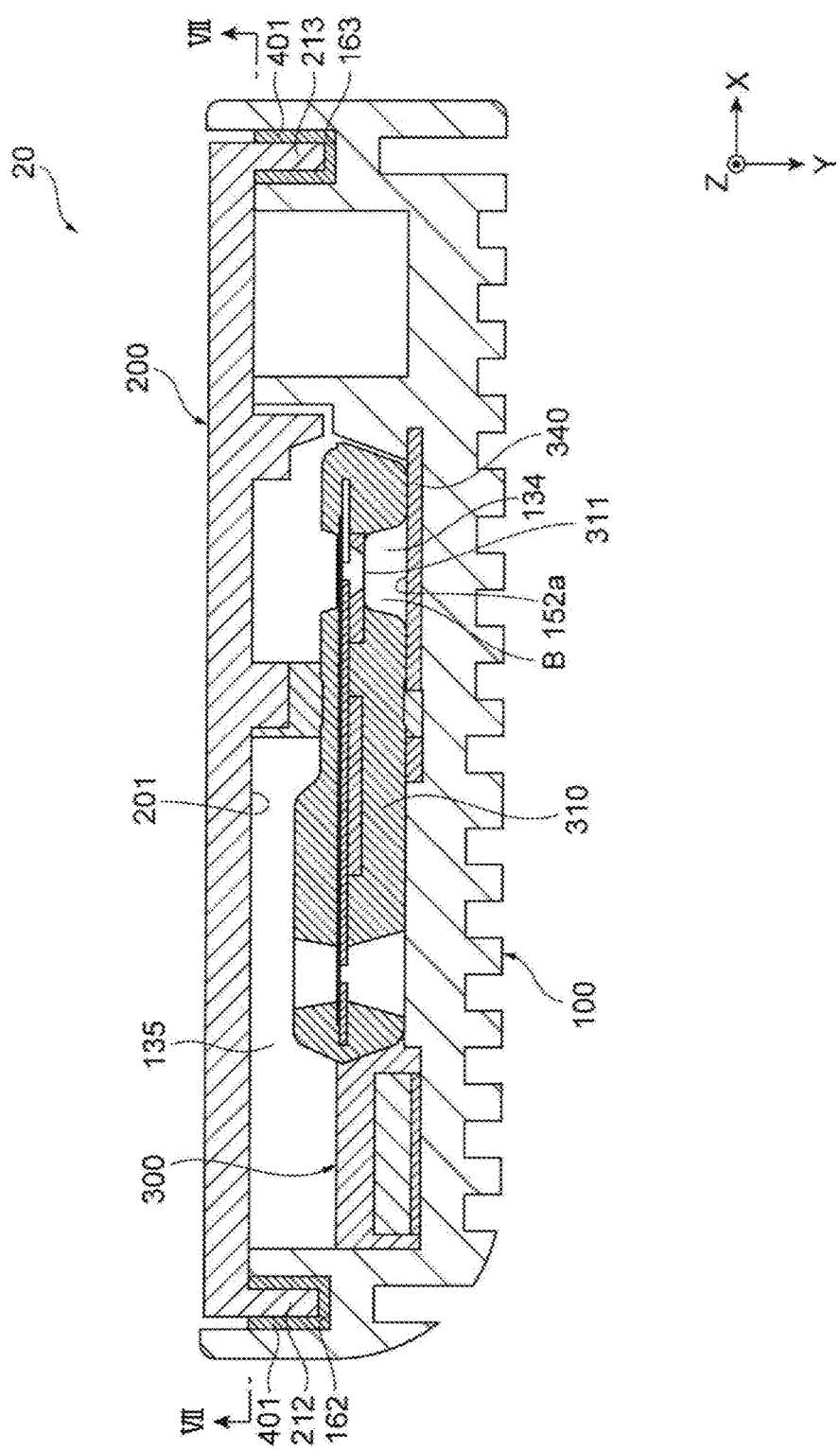

PHYSICAL QUANTITY DETECTION DEVICE

TECHNICAL FIELD

The present invention relates to a physical quantity detection device that detects a physical quantity of intake air of an internal combustion engine, for example.

BACKGROUND ART

PTL 1 discloses a structure of a flow rate measurement device including a base, a plate joined to the base by a surface along a flow direction of air that is a fluid to be measured, a flow rate detection element that is provided to be exposed to the plate and detects a flow rate of the air, a circuit board that is attached to a surface of the plate on the same side as the flow rate detection element and incorporates a control circuit that processes a signal from the flow rate detection element, and a cover bonded to the plate and the base.

According to PTL 1, the cover is bonded to the plate and the base with a thermosetting silicone adhesive. An inner wall surface of the flange and an outer peripheral wall surface of the cover facing the inner wall surface are bonded to each other by an epoxy adhesive.

CITATION LIST

Patent Literature

PTL 1: JP 2012-98101A

SUMMARY OF INVENTION

Technical Problem

For example, in a physical quantity detection device that detects a flow rate of intake air taken into an internal combustion engine, a device body is arranged in an intake passage. The device body preferably has a small thickness in order to reduce a pressure loss in the intake passage. However, when the thickness decreases, the rigidity of the main body portion decreases, and there is a possibility that the detection accuracy is affected. In order to improve the rigidity of the main body portion, it is known to use an epoxy adhesive, but since the epoxy adhesive has low viscosity, it is difficult to maintain sealability.

In the flow rate measurement device described in PTL 1, an inner wall surface of a flange and an outer peripheral wall surface of a cover facing the inner wall surface are bonded by an epoxy adhesive. Therefore, the amount of decrease in the cross-sectional coefficient at the bonded portion increases, rigidity decreases, deformation increases during vibration, and stress may concentrate on the root of the base body.

The invention has been made in view of the above points, and an object thereof is to provide a physical quantity detection device capable of achieving both improvement in rigidity and improvement in sealability.

Solution to Problem

A physical quantity detection device of the invention that solves the above problem includes: a housing that is arranged so as to protrude in a main passage through which a measurement target gas flows; a cover that constitutes a sub-passage in cooperation with the housing; a support body that is accommodated in the housing; and a sensor element that is supported by the support body and is arranged in the sub-passage. The housing includes: a first adhesive groove, which is an adhesive groove applied with an adhesive for bonding the cover, extends along a proximal end of the housing and extends along a protruding direction of the housing from the proximal end of the housing to a position on a distal end side of the housing with respect to the support body, and is applied with a first adhesive; and a second adhesive groove that extends along the sub-passage and is applied with a second adhesive. The first adhesive has a Young's modulus higher than that of the second adhesive, and the second adhesive has a thixotropy higher than that of the first adhesive.

Advantageous Effects of Invention

According to the invention, it is possible to obtain a physical quantity detection device capable of achieving both improvement in rigidity and improvement in sealability. Other features of the invention will be clear from the description and the accompanying drawings. In addition, objects, configurations, and effects besides the above description will be apparent through the explanation on the following embodiments.

BRIEF DESCRIPTION OF DRAWINGS

FIG. 2C is a diagram viewed in a direction of arrow IIC in FIG. 2A.

FIG. 2H is a cross-sectional view taken along line IIH-IIH in FIG. 2A.

DESCRIPTION OF EMBODIMENTS

Figure 1:
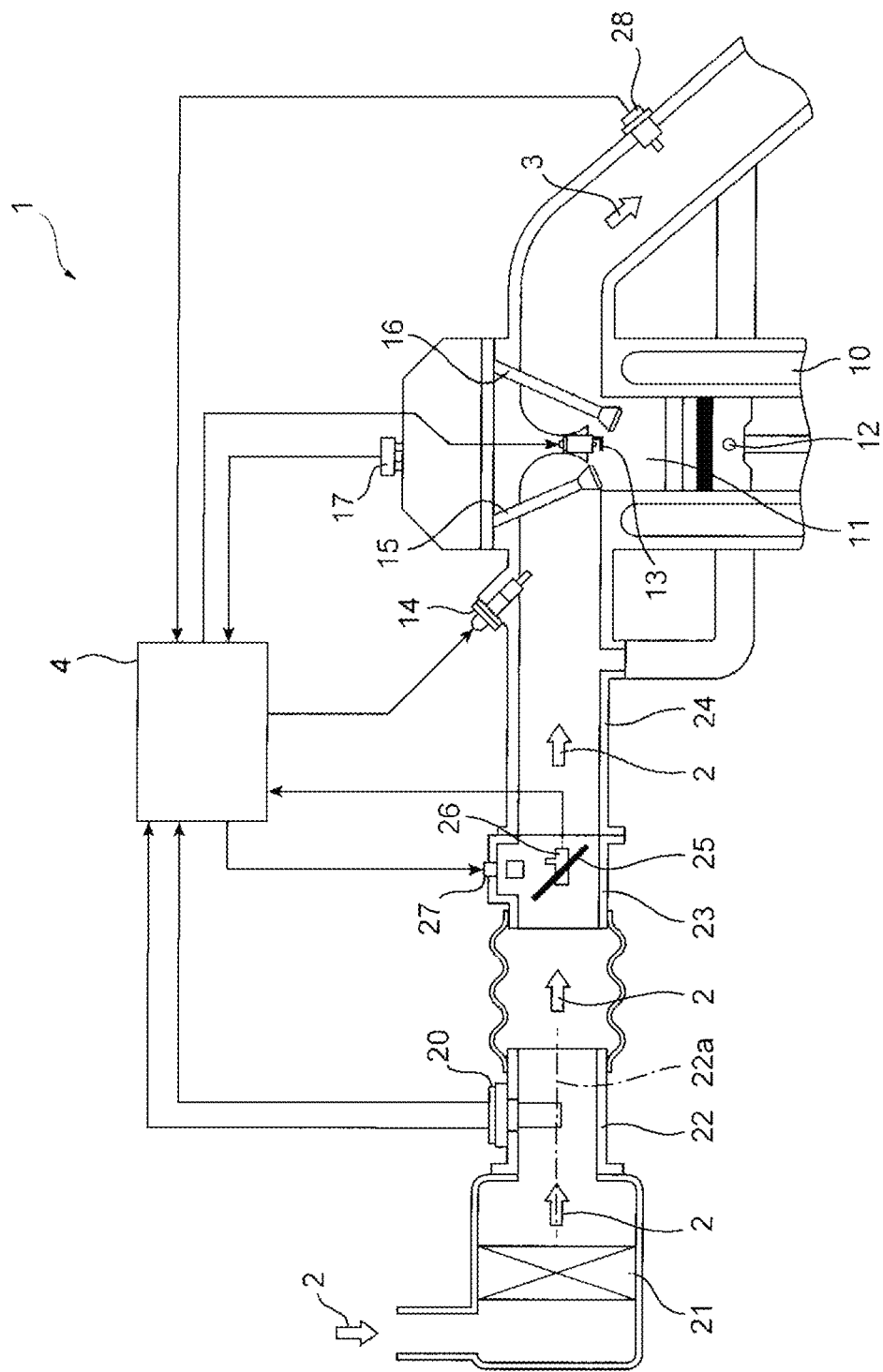
FIG. 1 is a system diagram illustrating an embodiment in which a physical quantity detection device according to the invention is used in an internal combustion engine control system.

A mode for carrying out the invention (embodiment) described below solves various problems desired as an actual product, and solves various problems desirable for use as a detection device that detects a physical quantity of intake air of a vehicle in particular, and exhibits various effects. One of the various problems solved by the following embodiments is the content described in the section of the problem to be solved by the invention described above, and one of the various effects achieved by the following embodiments is the effect described in the section of the effect of the invention. Various problems solved by the following embodiments and various effects achieved by the following embodiments will be described in the following description of the embodiments. Therefore, the problems and effects solved by the examples described in the following examples are also described in contents other than the contents in the section of the problem to be solved by the invention and the section of the effect of the invention.

In the following embodiments, the same reference numerals indicate the same configuration even if the figure numbers are different, and the same functions and effects are obtained. For the already described configuration, only reference numerals are given to the drawings, and description thereof may be omitted.

FIG. 1 is a system diagram illustrating an embodiment in which a physical quantity detection device according to the invention is used in an internal combustion engine control system 1 of an electronic fuel injection type. On the basis of the operation of an internal combustion engine 10 which includes an engine cylinder 11 and an engine piston 12, an intake air is sucked from an air cleaner 21 as a measurement target gas 2, and guided to a combustion chamber of the engine cylinder 11 through an intake body that is a main passage 22, a throttle body 23, and an intake manifold 24. The physical quantity of the measurement target gas 2, which is the intake air guided to the combustion chamber, is detected by the physical quantity detection device 20 according to the invention, fuel is supplied from the fuel injection valve 14 based on the detected physical quantity, and guided to the combustion chamber in an air-fuel mixture state together with the measurement target gas 2. Further, in this embodiment, the fuel injection valve 14 is provided with an intake port of the internal combustion engine. The fuel injected to the intake port forms an air-fuel mixture together with the measurement target gas 2, guided to the combustion chamber via an intake valve 15, and combusted to generate mechanical energy.

The fuel and the air guided to the combustion chamber are in a state where the fuel and the air are mixed. The air-fuel mixture is explosively combusted by spark ignition of an ignition plug 13 to generate mechanical energy. The gas after explosion is guided from an exhaust valve 16 to an exhaust pipe, and discharged as an exhaust gas 3 from the exhaust pipe to the outside of the vehicle. The flow rate of the measurement target gas 2, which is the intake air, guided to the combustion chamber is controlled by a throttle valve 25 of which the opening is changed on the basis of an operation of an accelerator pedal. The fuel supply amount is controlled on the basis of the flow rate of the intake air guided to the combustion chamber. An operator controls the flow rate of the intake air guided to the combustion chamber by controlling the opening of the throttle valve 25, so that the mechanical energy generated by the internal combustion engine can be controlled.

Physical quantities such as a flow rate, temperature, humidity, and pressure of the measurement target gas 2, which is the intake air taken in from the air cleaner 21 and flowing through the main passage 22, are detected by a physical quantity detection device 20, and an electric signal representing the physical quantity of the intake air is input from the physical quantity detection device 20 to a control device 4. In addition, the output of a throttle angle sensor 26 which measures the opening of the throttle valve 25 is input to the control device 4. Further, the output of a rotational angle sensor 17 is input to the control device 4 to measure the positions and states of the engine piston 12 of the internal combustion engine, the intake valve 15, and the exhaust valve 16, and a rotation speed of the internal combustion engine. The output of an oxygen sensor 28 is input to the control device 4 to measure a state of a mixture ratio between the fuel amount and the air amount of the exhaust gas 3.

The control device 4 calculates the fuel injection amount and the ignition timing based on the physical quantity of the intake air which is the output of the physical quantity detection device 20 and the rotational speed of the internal combustion engine measured based on the output of the rotational angle sensor 17. On the basis of these calculation results, the fuel amount supplied from the fuel injection valve 14 and the ignition timing of the ignition plug 13 are controlled. The fuel supply amount and the ignition timing are actually controlled finely on the basis of a change state of the temperature and throttle angle detected by the physical quantity detection device 20, a change state of the engine rotation speed, and a state of the air-fuel ratio measured by the oxygen sensor 28. The control device 4 controls an air amount bypassing the throttle valve 25 using an idle air control valve 27 in an idle operation state of the internal combustion engine, and controls the rotation speed of the internal combustion engine in the idle operation state.

The fuel supply amount and the ignition timing which are main control amounts of the internal combustion engine both are calculated using the output of the physical quantity detection device 20 as a main parameter. Therefore, the improvement in detection accuracy of the physical quantity detection device 20, the suppression from change with time, and the improvement in reliability are important to improve the control accuracy and to secure the reliability of the vehicle.

Particularly, in recent years, a desire for saving fuel of the vehicle is extremely increased, and a desire for cleaning the exhaust gas is extremely increased. In order to meet these demands, it is extremely important to improve the detection accuracy of the physical quantity of the intake air detected by the physical quantity detection device 20. It is also important that the physical quantity detection device 20 maintains high reliability.

The vehicle on which the physical quantity detection device 20 is mounted is used in an environment where changes in temperature and humidity are large. It is desirable that the physical quantity detection device 20 consider a response to a change in temperature or humidity in the use environment and a response to dust, contaminants, and the like.

The physical quantity detection device 20 is mounted on an intake pipe affected by heat generated from the internal combustion engine. Therefore, heat generated by the internal combustion engine is transmitted to the physical quantity detection device 20 via the intake pipe. Since the physical quantity detection device 20 detects the flow rate of the measurement target gas by performing heat transfer with the measurement target gas, it is important to suppress the influence of heat from the outside as much as possible.

As described below, the physical quantity detection device 20 mounted on the vehicle not only simply solves the problem described in the section of the problem to be solved by the invention and exerts the effect described in the section of the effect of the invention, but also solves various problems required as a product in sufficient consideration of the various problems described above and exerts various effects. Specific problems to be solved and specific effects to be obtained by the physical quantity detection device 20 will be described in the following description of embodiments.

First Embodiment

FIGS. 2A to 2F are diagrams illustrating an appearance of the physical quantity detection device. In the following description, it is assumed that the measurement target gas flows along the central axis of the main passage.

The physical quantity detection device 20 is used in a state of being inserted into the main passage 22 from a mounting hole provided in a passage wall of the main passage 22 and fixed to the main passage 22. The physical quantity detection device 20 includes a housing arranged in the main passage 22 through which the measurement target gas flows. The housing of the physical quantity detection device 20 includes a housing 100 and a cover 200 attached to the housing 100.

The housing 100 is formed by injection molding a synthetic resin material, for example. Examples of the cover 200 include a plate-like member made of a metal material and a plate-like member made of a synthetic resin material.

The housing 100 includes a flange 111 for fixing the physical quantity detection device 20 to the intake body that is the main passage 22, a connector 112 that protrudes from the flange 111 and is exposed to the outside from the intake body for electrical connection with an external device, and a measurement unit 113 that extends from the flange 111 so as to protrude toward the center of the main passage 22.

The measurement unit 113 has a thin and long shape extending straight from the flange 111, and includes a wide front surface 121, a back surface 122, and a pair of narrow side surfaces 123 and 124. The measurement unit 113 is arranged to protrude from the inner wall of the main passage 22 toward the passage center of the main passage 22 in a state where the physical quantity detection device 20 is attached to the main passage 22. Then, the front surface 121 and the back surface 122 are arranged in parallel along the central axis of the main passage 22. Among the narrow side surfaces 123 and 124 of the measurement unit 113, the side surface 123 on one side in the longitudinal direction of the measurement unit 113 is arranged to face the upstream side of the main passage 22, and the side surface 124 on the other side in the lateral direction of the measurement unit 113 is arranged to face the downstream side of the main passage 22. In a state where the physical quantity detection device 20 is attached to the main passage 22, the distal end portion of the measurement unit 113 is defined as a lower surface 125.

In the measurement unit 113, a sub-passage inlet 131 is provided on the side surface 123, and a first outlet 132 and a second outlet 133 are provided on the side surface 124. The sub-passage inlet 131, the first outlet 132, and the second outlet 133 are provided at the distal end portion of the measurement unit 113 extending from the flange 111 toward the center direction of the main passage 22. Therefore, the gas in the portion close to the central portion away from the inner wall surface of the main passage 22 can be taken into the sub-passage. Therefore, the physical quantity detection device 20 can measure the flow rate of the gas in the portion away from the inner wall surface of the main passage 22, and can suppress a decrease in measurement accuracy due to the influence of heat or the like.

Figure 2A:
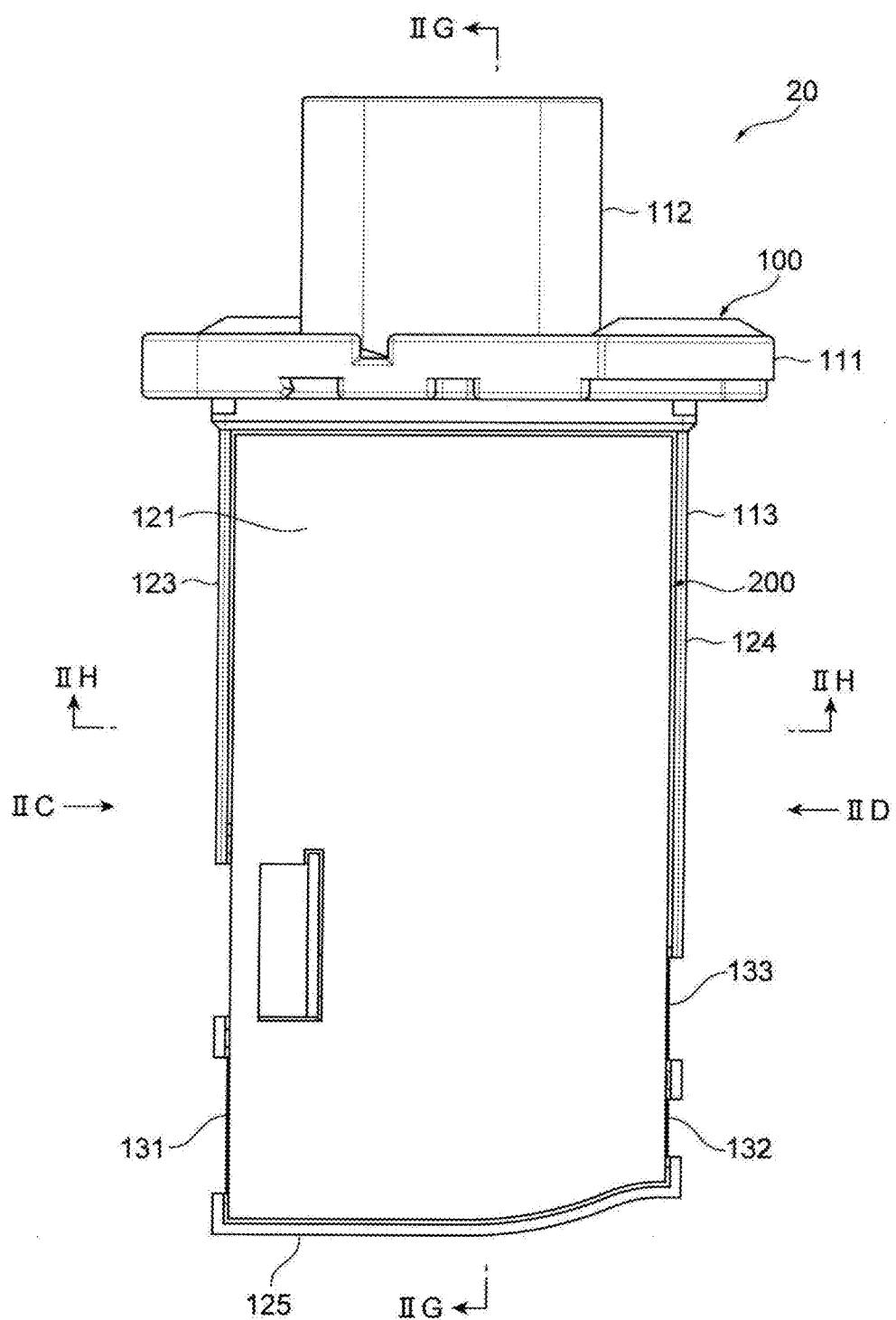
FIG. 2A is a front view of the physical quantity detection device.
Figure 2B:
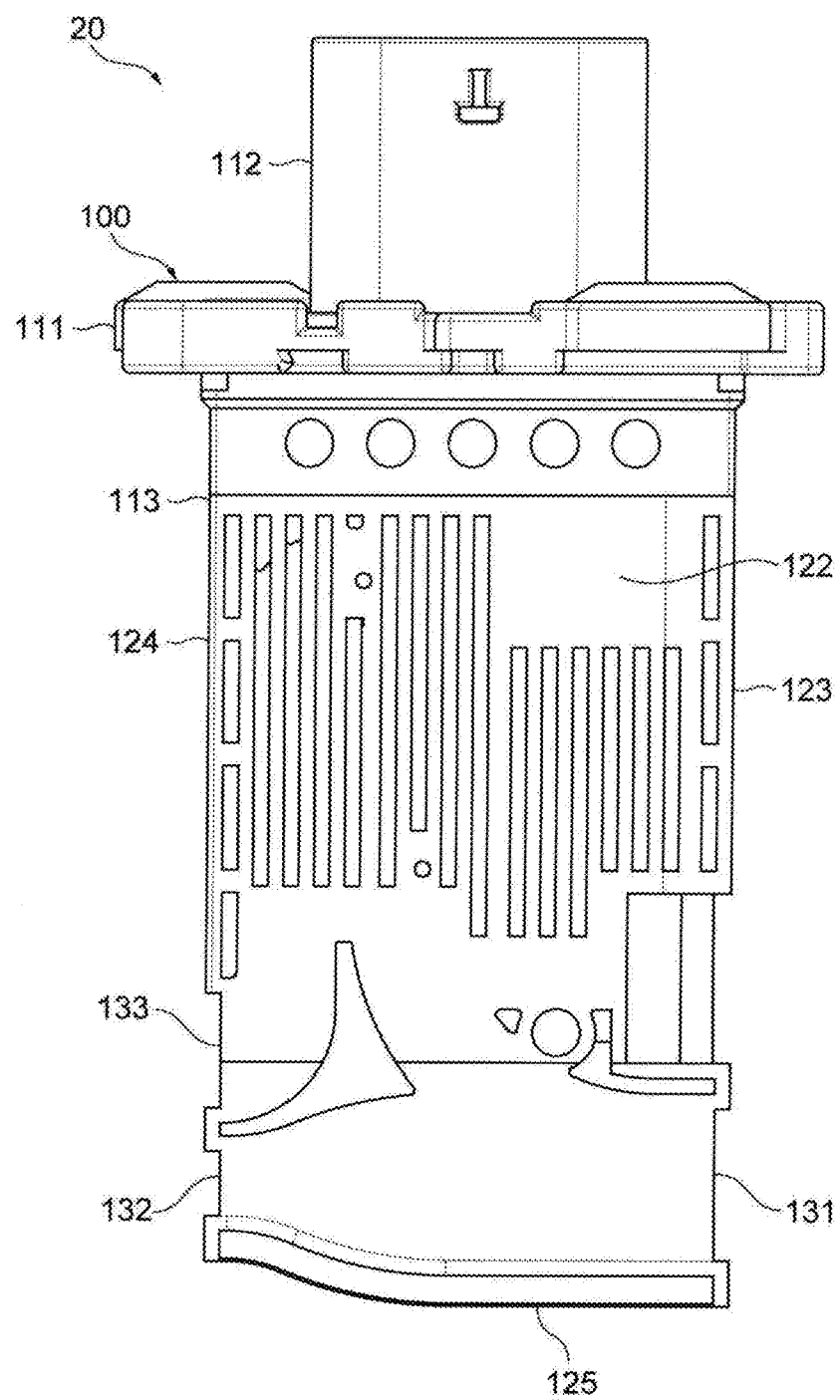
FIG. 2B is a rear view of the physical quantity detection device.
Figure 2D:
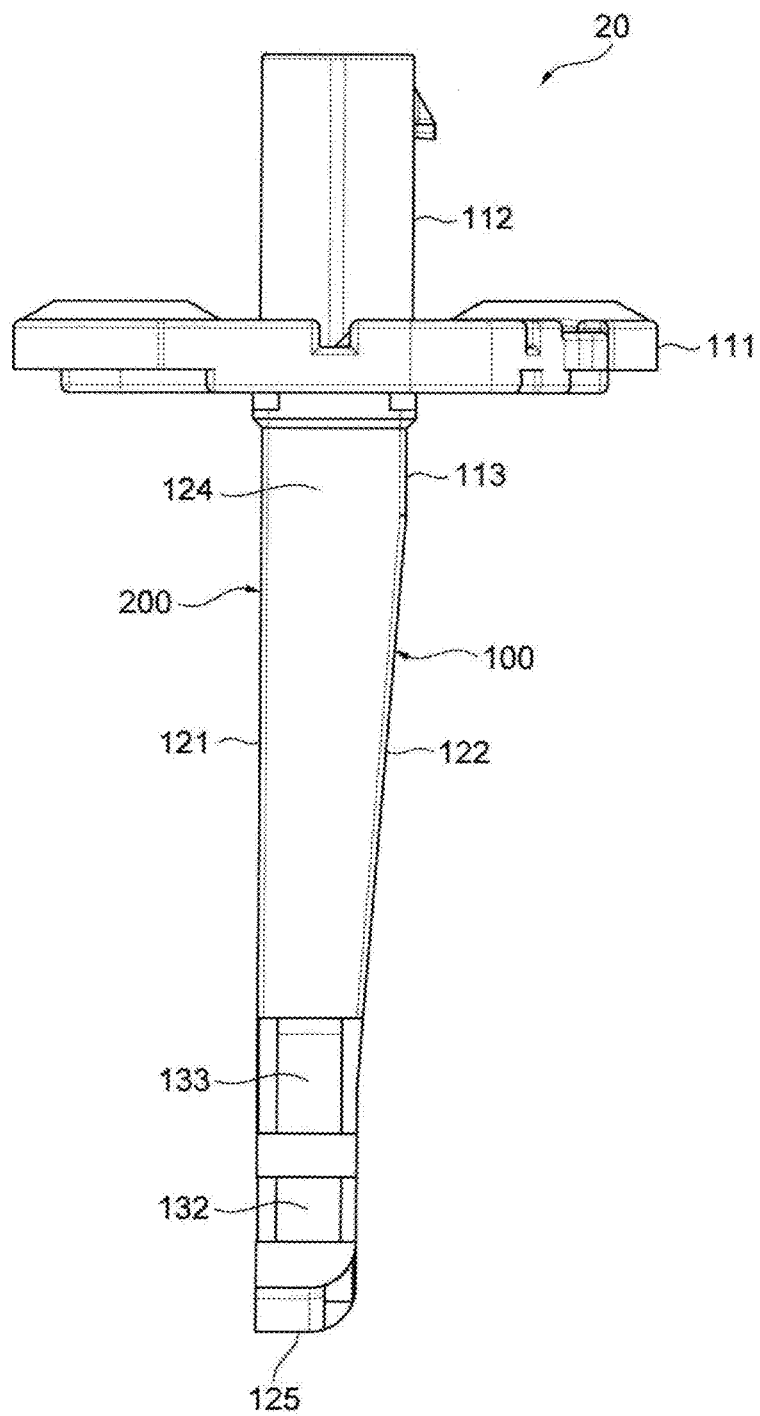
FIG. 2D is a diagram viewed in a direction of arrow IID in FIG. 2A.

The physical quantity detection device 20 has a shape in which the measurement unit 113 extends long along the axis from the outer wall of the main passage 22 toward the center, but the widths of the side surfaces 123 and 124 are narrow as illustrated in FIGS. 2B and 2D. As a result, the physical quantity detection device 20 can suppress the fluid resistance to a small value with respect to the measurement target gas 2.

Figure 2E:
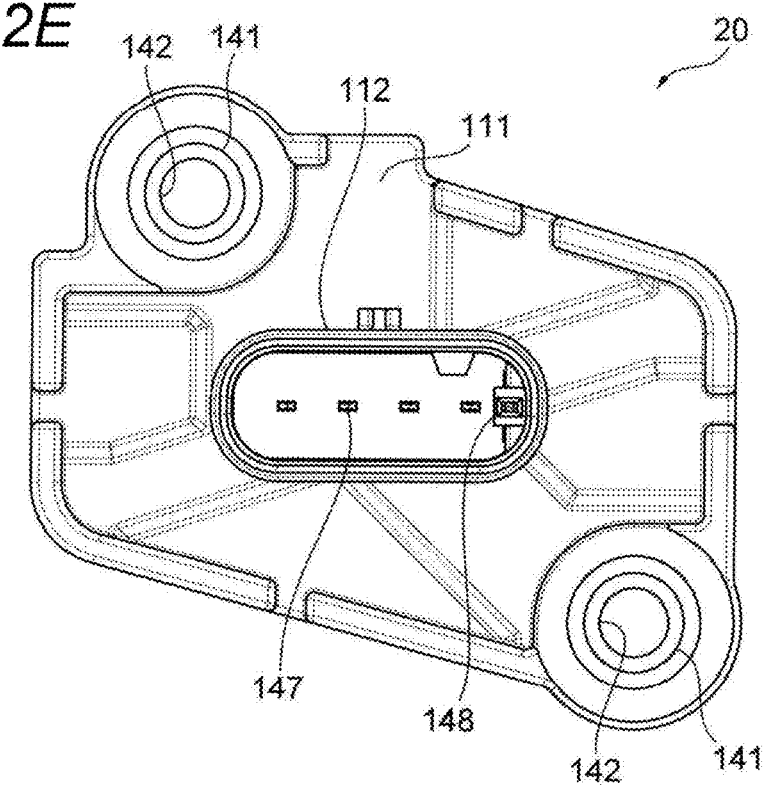
FIG. 2E is a plan view of the physical quantity detection device.
Figure 2F:
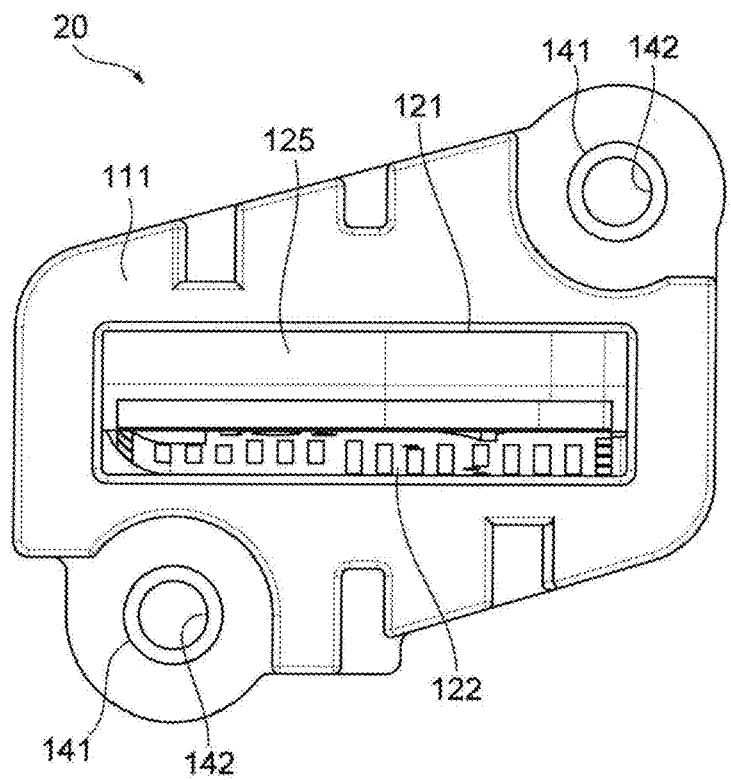
FIG. 2F is a bottom view of the physical quantity detection device.

The measurement unit 113 of the physical quantity detection device 20 is inserted into the inside from a mounting hole provided in the main passage 22, and the flange 111 of the physical quantity detection device 20 abuts on the main passage 22 and is fixed to the main passage 22 with a screw. The flange 111 has a substantially rectangular shape in plan view having a predetermined plate thickness, and as illustrated in FIGS. 2E and 2F, fixing hole portions 141 are provided in pairs at diagonal corners. The fixing hole portion 141 has a through hole 142 penetrating the flange 111.

The flange 111 is fixed to the main passage 22 by inserting a fixing screw (not illustrated) into the through hole 142 of the fixing hole portion 141 and screwing the fixing screw into a screw hole of the main passage 22.

As illustrated in FIG. 2E, four external terminals 147 and a correction terminal 148 are provided inside the connector 112. The external terminal 147 is a terminal for outputting a physical quantity such as a flow rate or a temperature which is a measurement result of the physical quantity detection device 20 and a power source terminal for supplying DC power for operating the physical quantity detection device 20. The correction terminal 148 is a terminal used to measure the produced physical quantity detection device 20, obtain the correction value related to each physical quantity detection device 20, and store the correction value in the memory inside the physical quantity detection device 20. In the subsequent measurement operation of the physical quantity detection device 20, the correction data representing the correction value stored in the memory is used, and the correction terminal 148 is not used.

Figure 2G:
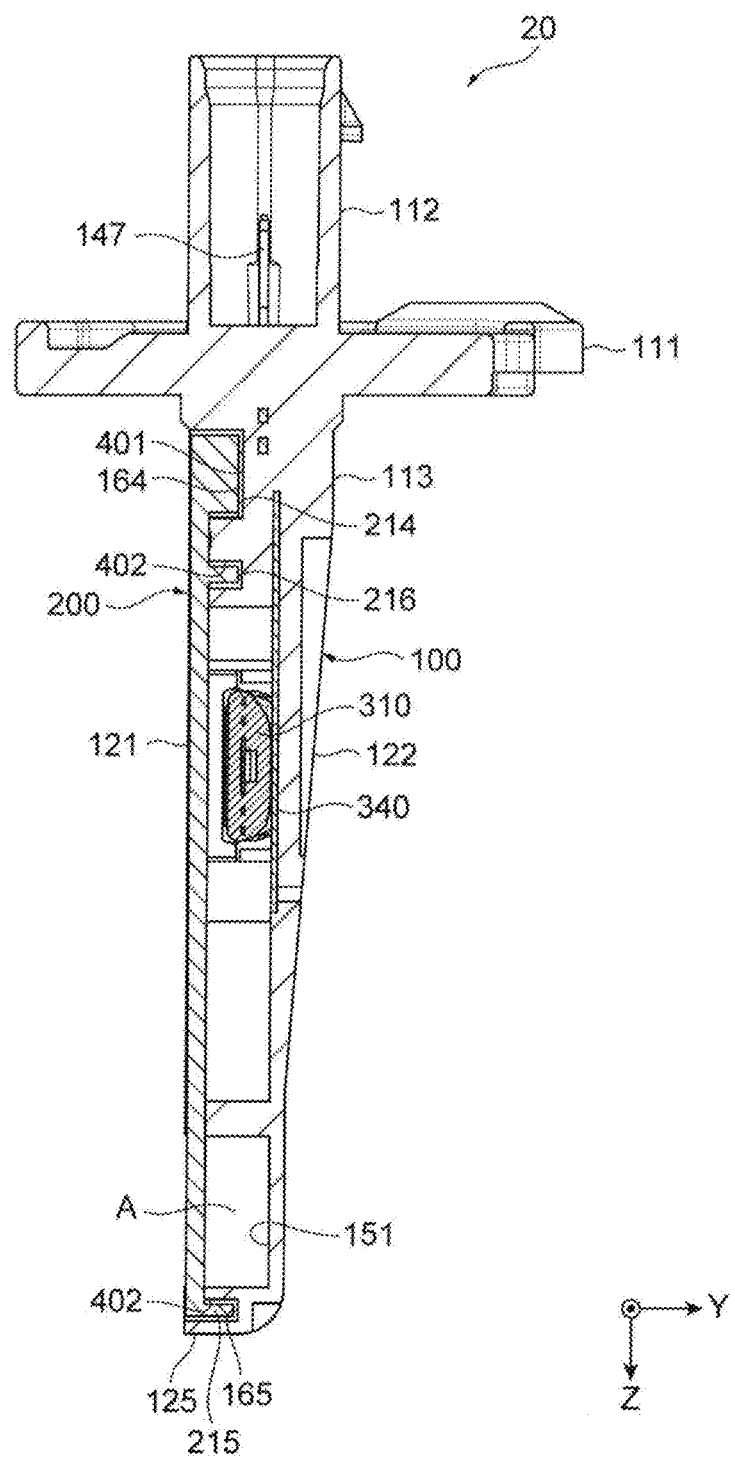
FIG. 2G is a cross-sectional view taken along line IIG-IIG in FIG. 2A.
Figure 3:
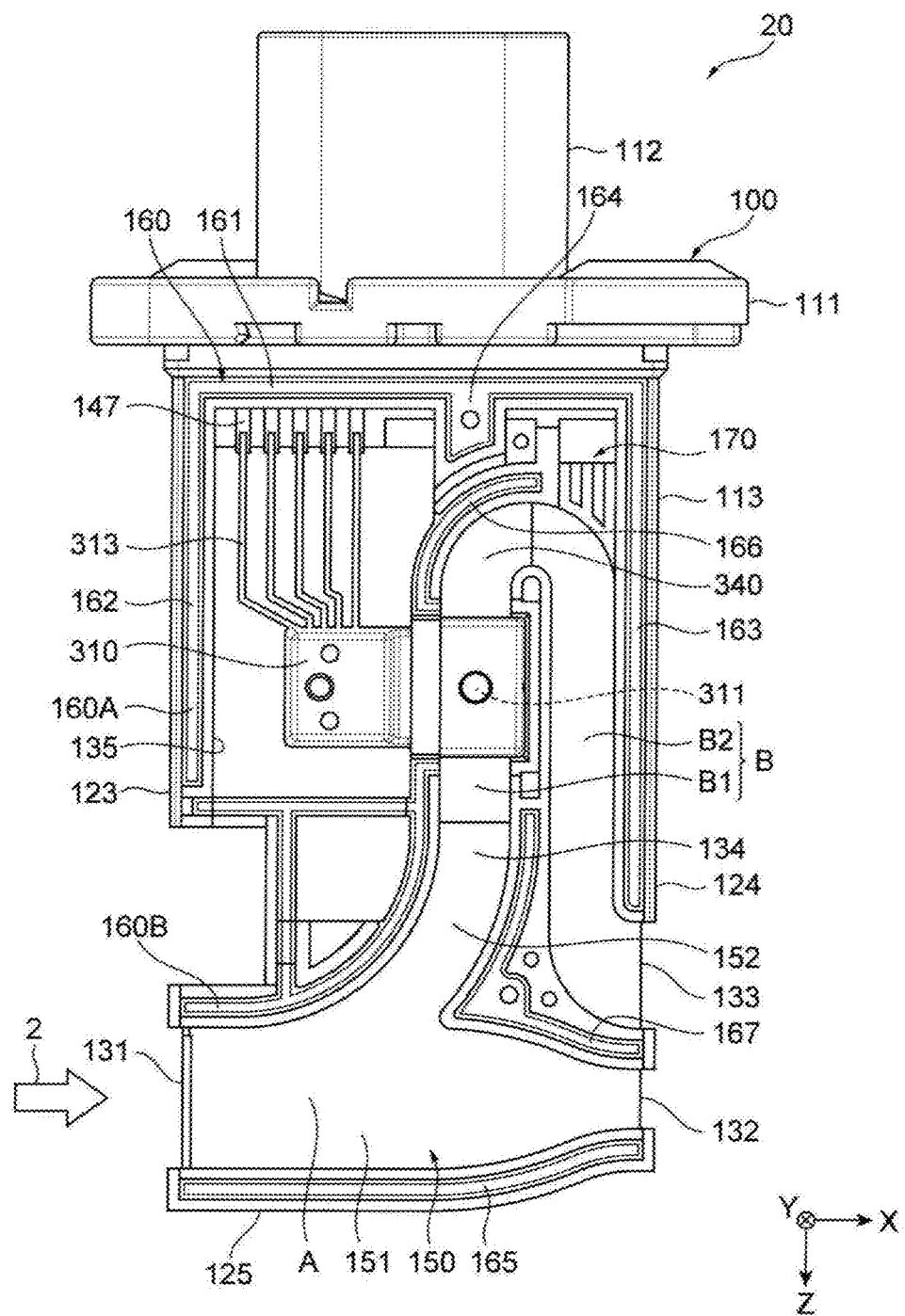
FIG. 3 is a front view of a housing.
Figure 4:
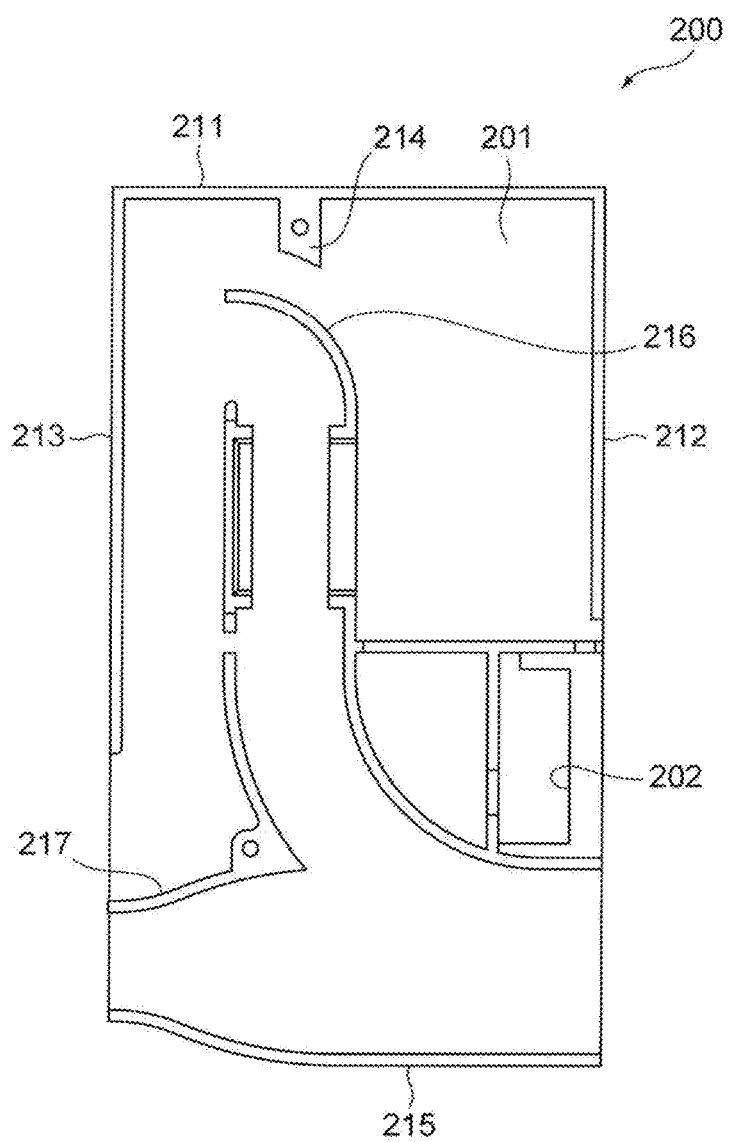
FIG. 4 is a rear view of a cover.
Figure 5:
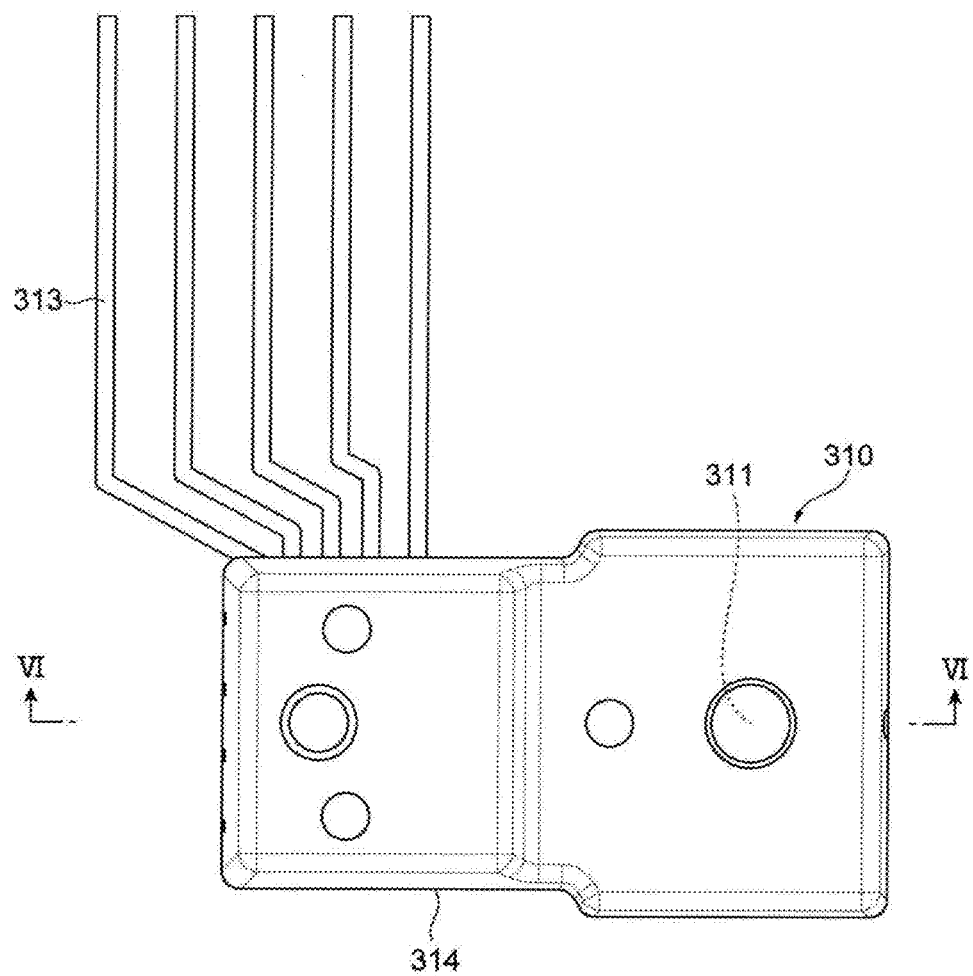
FIG. 5 is a front view of a chip package.
Figure 6:
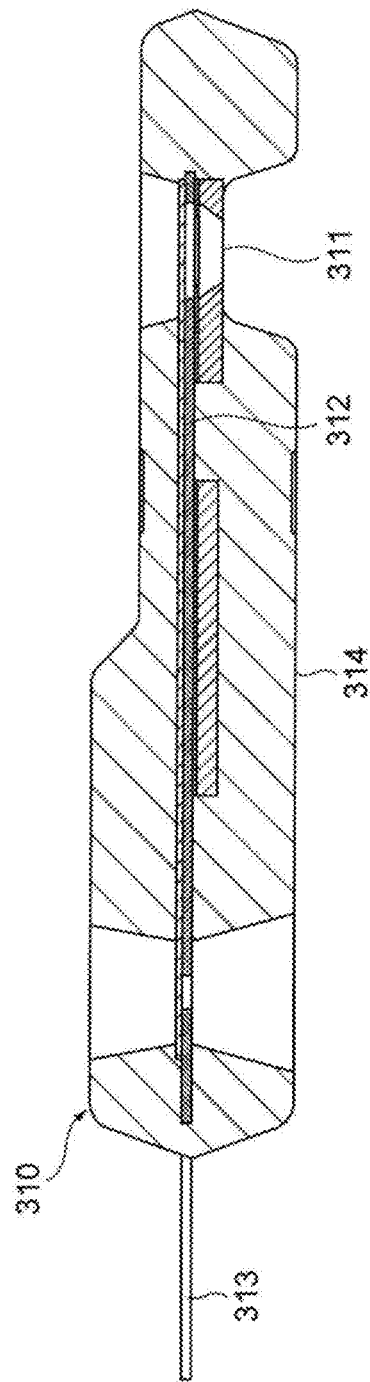
FIG. 6 is a cross-sectional view taken along line VI-VI of FIG. 5.

FIG. 2G is a cross-sectional view taken along line IIG-IIG in FIG. 2A, FIG. 2H is a cross-sectional view taken along line IIH-IIH in FIG. 2A, FIG. 3 is a front view of the housing and illustrates a state in which the cover is removed, FIG. 4 is a rear view of the cover, FIG. 5 is a front view of the chip package, and FIG. 6 is a cross-sectional view taken along line VI-VI in FIG. 5. Note that, in the following description, the longitudinal direction of the measurement unit 113, which is a direction in which the measurement unit 113 extends from the flange 111, may be referred to as a Z-axis, the lateral direction of the measurement unit 113, which is a direction extending from the sub-passage inlet 131 of the measurement unit 113 toward the first outlet 132, may be referred to as an X-axis, and the thickness direction of the measurement unit 113, which is a direction from the front surface 121 toward the back surface 122 of the measurement unit 113, may be referred to as a Y-axis.

The housing 100 is provided with a sub-passage groove 150 for forming the sub-passage 134 and a circuit chamber 135 for connecting a connection terminal of the chip package 310 to the external terminal 147. As illustrated in FIG. 3, the circuit chamber 135 and the sub-passage groove 150 are recessed in front of the measurement unit 113. The circuit chamber 135 is provided in a region on one side (side surface 123 side) in the X-axis direction which is a position on the upstream side in the flow direction of the measurement target gas 2 in the main passage 22. The sub-passage groove 150 is provided over a region on the distal end side in the Z-axis direction (lower surface 125 side) of the measurement unit 113 with respect to the circuit chamber 135, and a region on the other side in the X-axis direction (side surface 124 side) which is a position on the downstream side in the flow direction of the measurement target gas 2 in the main passage 22 with respect to the circuit chamber 135.

The sub-passage groove 150 is covered by the cover 200 to form the sub-passage 134. The sub-passage groove 150 includes a first sub-passage groove 151 and a second sub-passage groove 152 branching in the middle of the first sub-passage groove 151. The first sub-passage groove 151 is formed to extend along the X-axis direction of the measurement unit 113 between the sub-passage inlet 131 opened to the side surface 123 on one side of the measurement unit 113 and the first outlet 132 opened to the side surface 124 on the other side of the measurement unit 113. The first sub-passage groove 151 forms, in cooperation with the cover 200, a first sub-passage A that takes in the measurement target gas 2 flowing in the main passage 22 from the sub-passage inlet 131 and returns the taken measurement target gas 2 from the first outlet 132 to the main passage 22. The first sub-passage A has a flow path extending from the sub-passage inlet 131 along the flow direction of the measurement target gas 2 in the main passage 22 and connected to the first outlet 132.

The second sub-passage groove 152 branches at an intermediate position of the first sub-passage groove 151 and is bent toward the proximal end side (flange side) of the measurement unit 113, and extends along the Z-axis direction of the measurement unit 113. Then, the proximal end portion of the measurement unit 113 is bent toward the other side (side surface 124 side) in the X-axis direction of the measurement unit 113, turns around toward the distal end portion of the measurement unit 113, and extends again along the Z-axis direction of the measurement unit 113. The first outlet 132 is bent toward the other side (side surface 124 side) in the X-axis direction of the measurement unit 113 in front of the first outlet, and is provided so as to be continuous with the second outlet 133 opened to the side surface 124 of the measurement unit 113. The second outlet 133 is arranged to face the main passage 22 toward the downstream side in the flow direction of the measurement target gas 2. The second outlet 133 has an opening area substantially equal to or slightly larger than that of the first outlet 132, and is formed at a position adjacent to the measurement unit 113 on the proximal end side in the longitudinal direction from the first outlet 132.

The second sub-passage groove 152 forms, in cooperation with the cover 200, a second sub-passage B through which the flowing-in measurement target gas 2 branched from the first sub-passage A passes and which is returned from the second outlet 133 to the main passage 22. The second sub-passage B has a flow path that reciprocates along the Z-axis direction of the measurement unit 113. That is, the second sub-passage B has a forward passage portion B1 that branches off in the middle of the first sub-passage A and extends toward the proximal end side of the measurement unit 113 (direction away from the first sub-passage A), and a return passage portion B2 that is folded back and turned around on the proximal end side of the measurement unit 113 (end portion of the separation passage portion) and extends toward the distal end side of the measurement unit 113 (direction approaching the first sub-passage A). The return passage portion B2 is connected to the second outlet 133 that opens toward the downstream side in the flow direction of the measurement target gas 2 at a position on the downstream side in the flow direction of the measurement target gas 2 in the main passage 22 with respect to the sub-passage inlet 131.

In the second sub-passage B, a flow rate sensor (flow rate detection unit) 311 is arranged at an intermediate position of the forward passage portion B1. Since the second sub-passage B is formed so as to extend along the longitudinal direction of the measurement unit 113 and reciprocate, the passage length can be secured longer, and the influence on the flow rate sensor 311 can be reduced when pulsation occurs in the main passage.

The flow rate sensor 311 is provided in a chip package 310. As illustrated in FIG. 6, the chip package has a configuration in which the flow rate sensor 311 and the LSI are mounted on the lead frame 312, and the entire chip package is molded with resin. As illustrated in FIGS. 2H and 3, the chip package 310 includes a proximal end portion fixed to the circuit chamber 135 and a distal end portion arranged to protrude in the second sub-passage groove 152, and the flow rate sensor 311 is provided at the distal end portion.

The flow rate sensor 311 is supported by the chip package 310 so as to be exposed to the forward passage portion B1 of the second sub-passage B. The chip package 310 forms a supporting body which supports the flow rate sensor 311. The flow rate sensor 311 is arranged to face a groove bottom surface 152a of the second sub-passage groove 152 with a predetermined interval, and measures the flow rate of the measurement target gas passing through the second sub-passage B. As illustrated in FIGS. 3 and 5, the chip package 310 is provided with a plurality of outer leads 313 at the proximal end portion, and is connected to the external terminal 147 by laser welding in the circuit chamber 135. The outer lead 313 is formed by protruding a part of the lead frame 312 from the package body of the chip package 310.

The housing 100 is provided with a neutralization plate 340 for neutralizing the measurement target gas passing through the second sub-passage B. As illustrated in FIG. 2H, the neutralization plate 340 is provided to be exposed to the second sub-passage groove 152 so as to form a part of the groove bottom surface 152a of the second sub-passage groove 152. As illustrated in FIG. 3, the neutralization plate 340 is provided to extend from a position on the first sub-passage A side, which is on the upstream side of the chip package 310 in the flow direction of the measurement target gas in the forward passage portion B1 of the second sub-passage B to a position on the second outlet 133 side, which is on the downstream side of the chip package 310 in the flow direction of the measurement target gas, through a position facing the flow rate sensor 311 of the chip package 310. The neutralization plate 340 is electrically connected to the external terminal 147 and neutralizes the measurement target gas passing through the second sub-passage B. Therefore, it is possible to prevent foreign matter contained in the measurement target gas from adhering to the chip package 310 or the flow rate sensor 311 due to charging.

Figure 7:
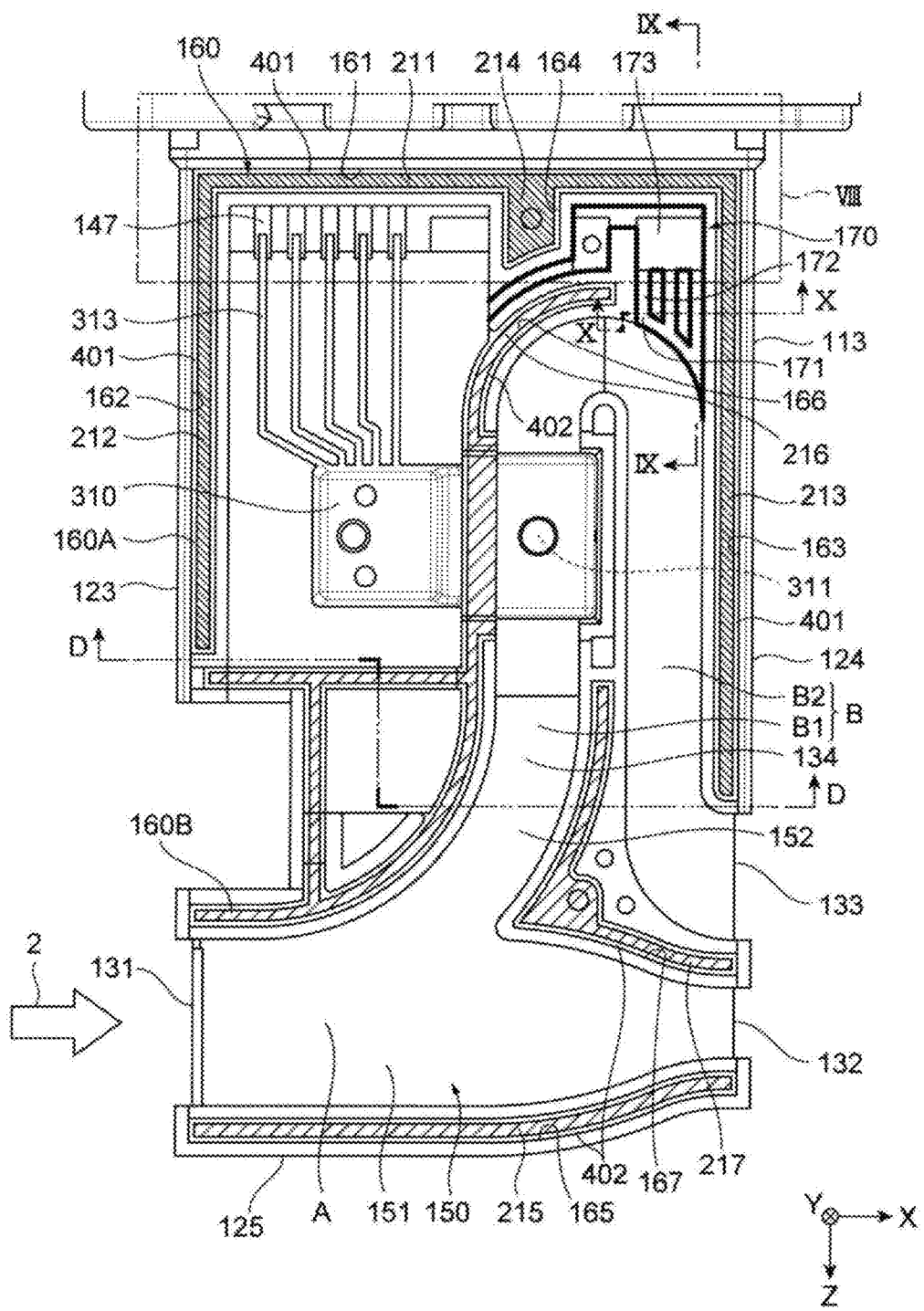
FIG. 7 is a cross-sectional view of the measurement unit of the physical quantity detection device taken along line VII-VII in a direction of arrow illustrated in FIG. 2H.

The housing 100 is provided with a ventilation passage 170 capable of introducing the measurement target gas from the second sub-passage B into the circuit chamber 135. As illustrated in FIG. 7, the ventilation passage 170 has a configuration in which one end is opened in the middle of the passage of the second sub-passage B, the other end is opened to the circuit chamber 135, and the pressure of the measurement target gas can be introduced from the second sub-passage B to the circuit chamber 135. The ventilation passage 170 is recessed in a groove shape in the measurement unit 113, and is configured in cooperation with the cover 200. The ventilation passage 170 includes an introduction port 171 that opens at a position offset from the passage wall surface of the second sub-passage B, a linear portion 172 having a sled shape and linearly extending from the introduction port 171, and a bent portion 173 having a labyrinth shape and connected to the circuit chamber 135 while being bent a plurality of times continuously with the linear portion 172.

The cover 200 has a flat plate shape covering the circuit chamber 135 and the sub-passage groove 150 of the measurement unit 113, and is bonded to the front surface 121 of the housing 100. As illustrated in FIG. 4, the cover 200 is provided with ribs 211 to 217 on the back surface 201. The ribs 211 to 217 are formed along a bonded portion with the measurement unit 113 of the housing 100.

Figure 8:
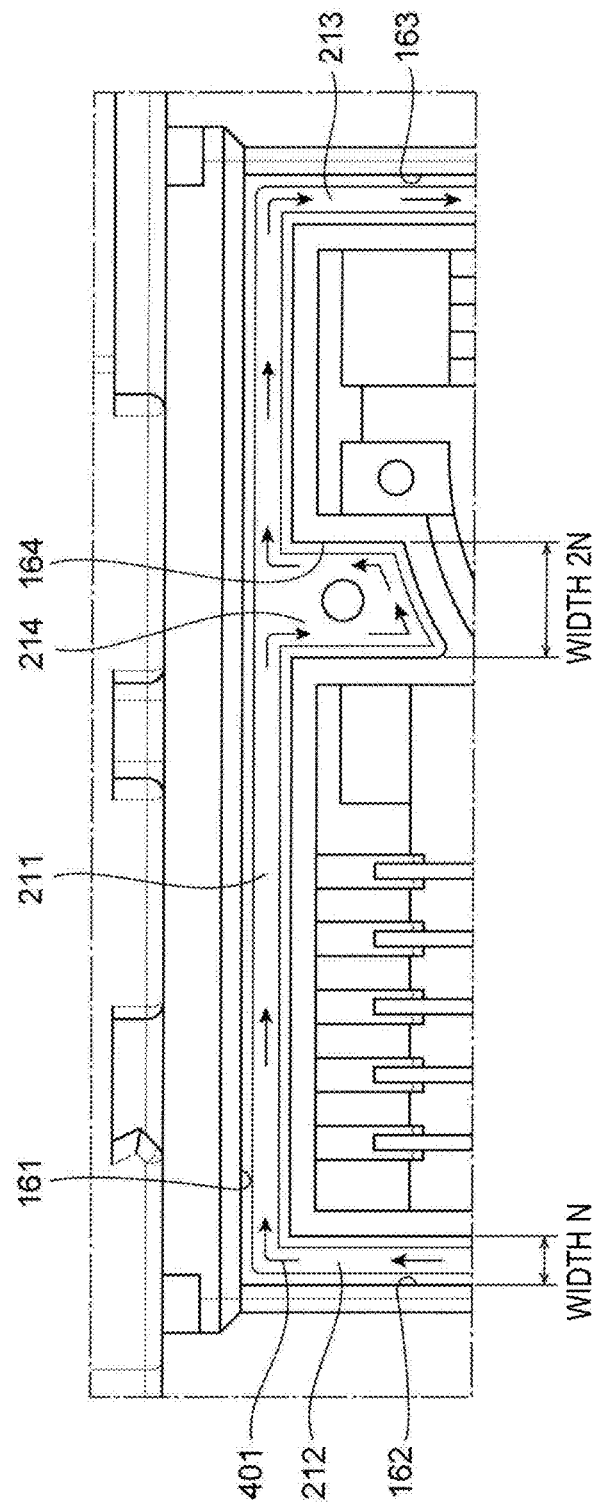
FIG. 8 is an enlarged view illustrating a main part VIII of the configuration illustrated in FIG. 7.
Figure 9:
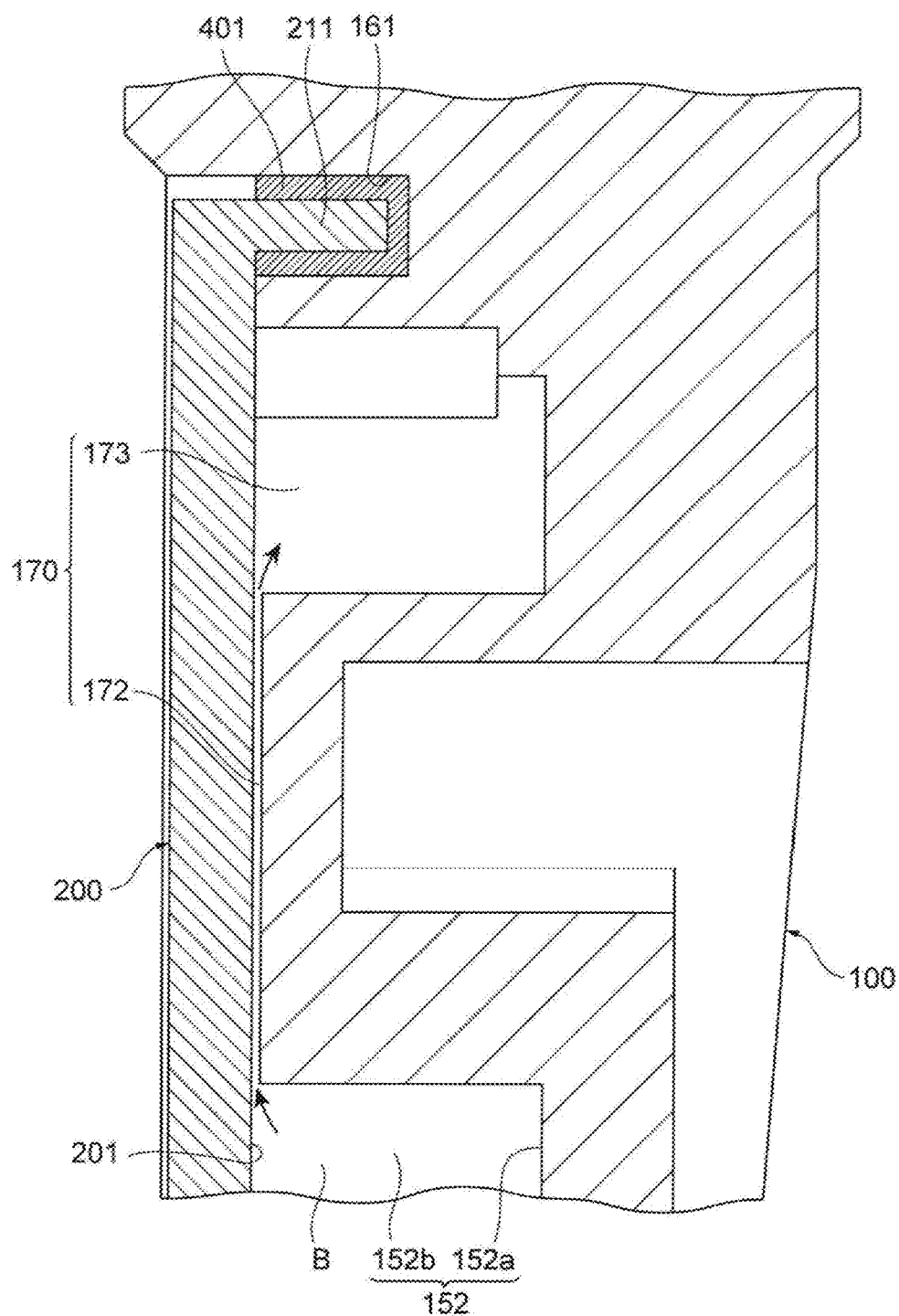
FIG. 9 is a cross-sectional view taken along line IX-IX of FIG. 7.
Figure 10:
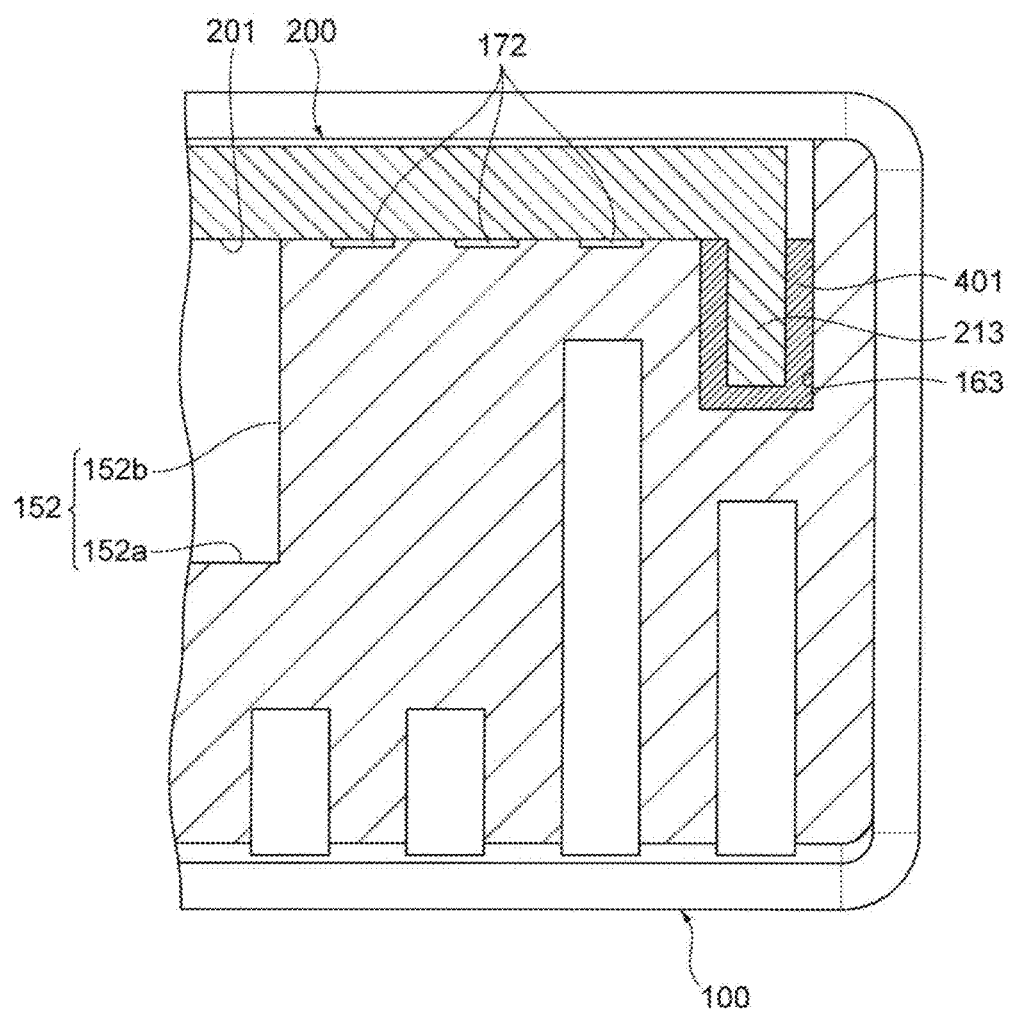
FIG. 10 is a cross-sectional view taken along line X-X of FIG. 7.

FIG. 7 is a cross-sectional view of the measurement unit of the physical quantity detection device taken along line VII-VII in a direction of arrow shown in FIG. 2H, FIG. 8 is an enlarged view illustrating main part VIII of the configuration in FIG. 7, FIG. 9 is a cross-sectional view taken along line IX-IX in FIG. 7, and FIG. 10 is a cross-sectional view taken along line X-X in FIG. 7.

An adhesive groove 160 to which an adhesive for bonding the cover 200 is applied is formed in the measurement unit 113 of the housing 100. The adhesive groove 160 is formed on the front surface of the measurement unit 113 and along a bonded portion to the cover 200, and the ribs 211 to 217 of the cover 200 are inserted and bonded to the cover 200 with an adhesive in the groove.

As illustrated in FIGS. 7 and 3, the adhesive groove 160 includes a first adhesive groove 160A to which a first adhesive 401 is applied and a second adhesive groove 160B to which a second adhesive 402 is applied. The first adhesive groove 160A is configured to extend along the proximal end of the housing 100 and extend from the proximal end of the housing 100 to a position on the distal end side of the housing 100 with respect to the chip package 310 along the protruding direction of the housing 100 so as to apply the first adhesive 401. The second adhesive groove 160B extends along the sub-passage 134.

The first adhesive groove 160A includes a groove portion 161 extending in the X-axis direction along the base end of the housing 100 and groove portions 162 to 164 extending in the Z-axis direction from the groove portion 161. The second adhesive groove 160B has groove portions 165 to 167 extending in the X-axis direction and the Y-axis direction along sub-passage grooves 151 and 152 constituting the sub-passage 134.

As illustrated in FIG. 7, the groove portion 161 of the first adhesive groove 160A is provided to linearly extend between the side surface 123 on one side in the X-axis direction and the side surface 124 on the other side in the X-axis direction at the root portion which is the base end of the measurement unit 113. The groove portion 162 is provided to linearly extend to a position closer to the distal end side of the housing 100 than the chip package 310 along the side surface 123 which is one outer edge of the measurement unit 113 of the housing 100. Similarly, the groove portion 163 is provided to linearly extend to a position closer to the distal end side of the housing 100 than the chip package 310 along the side surface 124 which is the other outer edge of the measurement unit 113 of the housing 100. The groove portions 162 and 163 extend to a position D-D on the distal end side of the chip package 310. The groove portion 164 extends in the X-axis direction from the intermediate position of the groove portion 161 toward the distal end side of the housing 100. Note that the groove portion 161 corresponds to a proximal end groove portion in the claims, the groove portions 162 and 163 correspond to a pair of outer edge groove portions in the claims, and the groove portion 164 corresponds to an intermediate groove portion in the claims.

As illustrated in FIGS. 9 and 10, the groove portions 161 to 164 of the first adhesive groove 160A has a depth and a groove width that can be accommodated in a state where the ribs 211 to 214 of the cover 200 are inserted and the first adhesive 401 is interposed therebetween.

As illustrated in FIG. 8, the groove portions 161, 162, and 163 have a constant groove width N, and the groove portion 164 has a groove width 2N that is twice the groove width N of the groove portions 161, 162, and 163. In this embodiment, since the groove width of the groove portion 164 is set to twice the groove width of the groove portions 161, 162, and 163, for example, when the first adhesive 401 is applied in the direction indicated by the arrow in FIG. 8, the first adhesive 401 can be applied to the entire groove portion 164 only by reciprocating in the extending direction of the groove portion 164 in the groove portion 164. Therefore, the first adhesive 401 can be continuously applied to the groove portions 161 to 164 like a single stroke, and the application process can be simplified and shortened. Although the double is taken as an example, the writing can be similarly performed with an even number of times. In a case where the space is limited, it is preferable to double the space.

The groove portion 165 of the second adhesive groove 160B is provided to extend in the X-axis direction along the sub-passage 134 at the distal end of the housing 100. More specifically, the first sub-passage groove 151 extends between the side surface 123 on one side in the X-axis direction and the side surface 124 on the other side in the X-axis direction along the end portion on the housing distal end side of both sides in the groove width direction of the first sub-passage groove.

The groove portion 166 is provided to extend in the Z-axis direction along the sub-passage 134 from the distal end toward the proximal end of the housing. More specifically, the first sub-passage groove 151 extends from the side surface 123 toward the side surface 124 along the end portion on the housing proximal end side of both sides in the groove width direction of the first sub-passage groove, curves toward the proximal end of the housing 100 at the intermediate position, and extends from the forward passage portion B1 of the second sub-passage B to the folded portion folded back to the return passage portion B2 along the partition wall partitioning between the second sub-passage groove 152 and the circuit chamber 135.

The groove portion 167 extends from a portion where the first sub-passage groove 151 and the second sub-passage groove 152 branch toward the side surface 124 on the other side in the X-axis direction, and extends along the Z-axis direction toward the housing proximal end side. The groove portion 167 has a portion extending in the X-axis direction along an end portion on the housing proximal end side of both sides in the groove width direction of the first sub-passage groove 151 and a portion extending in the Y-axis direction along a partition wall of the second sub-passage groove 152 partitioning between the forward passage portion B1 and the return passage portion B2.

The first adhesive 401 is characterized by having a higher Young's modulus than the second adhesive 402, and the second adhesive 402 is characterized by having a higher thixotropy than the first adhesive 401. In this embodiment, an epoxy adhesive having a linear expansion coefficient lower than that of the housing 100 is used for the first adhesive 401, and a silicone adhesive is used for the second adhesive 402. The first adhesive 401 can improve the rigidity of the housing 100, and the second adhesive 402 can improve the adhesion of the cover 200.

In the physical quantity detection device 20 described above, the housing 100 and the cover 200 are bonded and fixed using two types of the first adhesive 401 for improving the rigidity and the second adhesive 402 for improving the adhesion, and the region to which the adhesive is applied is separately applied according to the application, thereby achieving both the rigidity and the adhesion.

In the physical quantity detection device 20, a first adhesive 401 having high adhesive strength (high Young's modulus) is applied to the proximal end of the measurement unit 113 which is a portion requiring strength and a portion extending from the proximal end toward the distal end, and a second adhesive 402 having high thixotropy is applied to the sub-passage 134 requiring a seal structure and the periphery of the chip package 310. That is, the first adhesive having higher adhesive strength than the second adhesive having high elasticity is provided with the adhesive region so as to extend from the proximal end toward the distal end of the measurement unit 113.

As described above, by applying the first adhesive 401 having a high Young's modulus to the proximal end of the measurement unit 113 and the portion extending from the proximal end, the adhesive strength between the portion on the proximal end portion of the housing 100 and the cover 200 can be increased, and the rigidity of the entire device can be improved. In addition, by applying an adhesive having high thixotropy along the sub-passage 134, it is possible to maintain a shape in which a gap is filled at the time of application, to eliminate shape deformation before and after curing, and to secure sealability between the circuit chamber 135 and the sub-passage 314 around the chip package 310. Therefore, both the rigidity and the adhesion can be obtained, the vibration of the measurement unit 113 at the time of vibration can be suppressed by improving the rigidity, the stress acting on the measurement unit 113 can be reduced, the thickness of the measurement unit 113 can be reduced, and the pressure loss reduction effect can be obtained.

In the physical quantity detection device 20 of this embodiment, the pair of adhesive grooves 162 and 163 of the first adhesive groove 160A extends from the proximal end of the measurement unit 113 to the housing distal end side (upstream side with respect to the main flow of the sub-passage) with respect to the upstream end of the measurement unit (thin film portion) of the flow rate sensor element 311. The first adhesive is applied to the first adhesive groove 160A. The distance between the measurement unit of the sensor element 311 and the wall surface facing the measurement unit greatly affects the flow rate detection accuracy. Since the first adhesive is applied so as to extend to the upstream side of the measurement portion in the main flow direction of the sub-passage, it is possible to suppress deformation of the passage shape in the vicinity of the measurement portion of the sensor element due to vibration, and thus, the measurement accuracy of the flowmeter is improved.

More preferably, the pair of adhesive grooves 162 and 163 extends from the proximal end of the measurement unit 113 to the housing distal end side (upstream side with respect to the main flow of the sub-passage) with respect to the upstream end portion of the chip package 310 which is the support of the sensor element 311, and the first adhesive is applied to the first adhesive groove 160A. At the upstream end of the chip package 310, the fluid flows separately to the front surface side (measurement unit side) and the back surface side. By applying the first adhesive by extending to the upstream side in the main flow direction of the sub-passage from the upstream end of the chip package 310, it is possible to suppress deformation of the passage shape in the vicinity of the flow dividing portion due to vibration, and it is possible to suppress fluctuation of the flow dividing ratio, so that the flow rate accuracy is further improved.

In addition, in the physical quantity detection device 20, the groove portion 164 of the first adhesive groove 160A is provided to extend in the X-axis direction from the intermediate position of the groove portion 161 toward the distal end side of the housing 100. The first adhesive 401 having a high Young's modulus is applied to the groove portion 164. Therefore, the rigidity of the entire device is further enhanced, and the influence of vibration and thermal stress can be reduced. Note that, in the above-described embodiment, the case where the number of groove portions 164 is one has been described as an example, but a plurality of groove portions may be provided, and the rigidity of the entire device can be further improved according to an increase in the number of groove portions 164.

Second Embodiment

Figure 11:
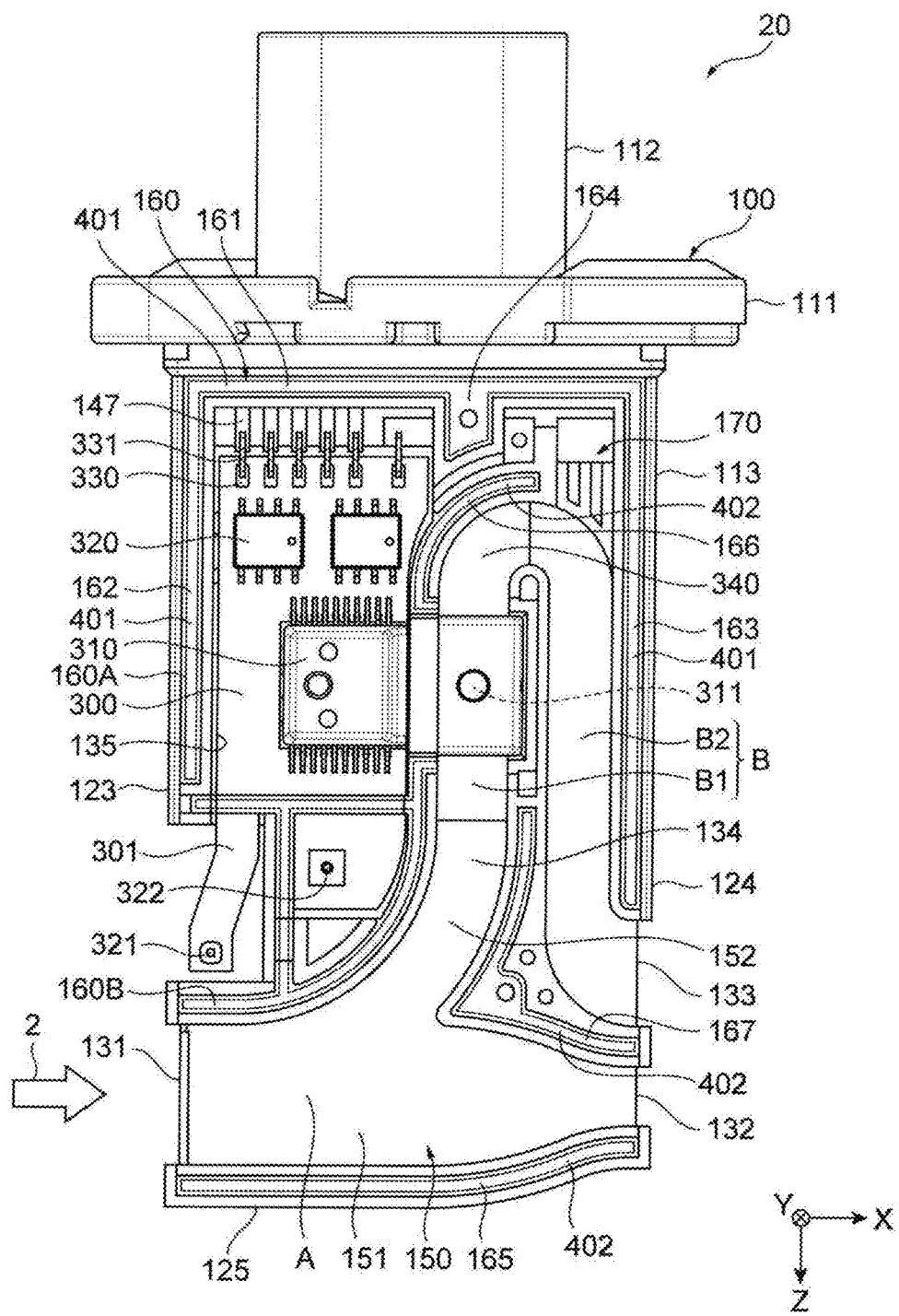
FIG. 11 is a diagram for explaining a modification of the first embodiment.

Next, the physical quantity detection device 20 according to a second embodiment of the invention will be described. FIG. 11 is a diagram for explaining a modification of the first embodiment.

A characteristic feature of this embodiment is that the circuit board 300 is housed in the circuit chamber 135, and the chip package 310 and the pressure sensor 320 are mounted on the circuit board 300.

The circuit chamber 135 and the second sub-passage B are connected by a pressure introduction passage 170, and the pressure of the second sub-passage B can be introduced into the circuit chamber 135. The pressure sensor 320 mounted on the circuit board 300 in the circuit chamber 135 can detect the pressure introduced from the second sub-passage B into the circuit chamber 135 through the pressure introduction passage 170.

The second adhesive groove 160B is formed at a boundary portion between the circuit chamber 135 and the second sub-passage groove 152, and the second adhesive 402 is applied to the second adhesive groove 160B. Therefore, it is possible to reliably seal the boundary portion between the circuit chamber 135 and the second sub-passage groove 152, prevent the measurement target gas 2 from directly entering the circuit chamber 135 from the second sub-passage B and the mounting component of the circuit board 300 from being exposed to the substance such as the gas contained in the measurement target gas 2, and protect the mounting component.

Further, in this embodiment, a circuit component (not illustrated) is mounted on the circuit board 300, and is sealed by silicon gel which is a silicone-based sealing member. Therefore, these circuit components can be prevented from being exposed to a substance such as a gas in the circuit chamber 135, and the mounting components can be protected.

Hitherto, the embodiments of the invention have been described, but the invention is not limited to the embodiments. Various modifications may be made within a scope not departing from the spirit of the invention disclosed in claims. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

REFERENCE SIGNS LIST 2 measurement target gas
20 physical quantity detection device
100 housing
135 circuit chamber (sensor chamber)
160 adhesive groove
160A first adhesive groove
160B second adhesive groove
200 cover
310 chip package
311 flow rate sensor (sensor element)
320 pressure sensor
401 first adhesive
402 second adhesive
B second sub-passage
B1 forward passage portion
B2 return passage portion

The invention claimed is:

1. A physical quantity detection device, comprising:
a housing that is inserted from a distal end side through an insertion hole of a main passage through which a measurement target gas flows and arranged in the main passage;
a cover that constitutes a sub-passage that takes in a part of the measurement target gas flowing through the main passage in cooperation with the housing;
a support body that is accommodated in the housing; and
a sensor element that is supported by the support body and arranged in the sub-passage,
wherein the housing includes:
a first adhesive groove that has a proximal end groove portion extending along a proximal end of the housing and a pair of groove portions extending from the proximal end groove portion to a distal end side of the housing with respect to a measurement unit of the sensor element, the first adhesive groove being applied with a first adhesive; and
a second adhesive groove that extends along the sub-passage and to which a second adhesive is applied, and
the first adhesive has a Young's modulus higher than that of the second adhesive, and the second adhesive has a thixotropy higher than that of the first adhesive.

2. The physical quantity detection device according to claim 1, wherein the pair of adhesive grooves extends to a distal end side of the housing from the support body.

3. The physical quantity detection device according to claim 2, wherein the first adhesive groove includes an intermediate groove portion extending from an intermediate position in an extending direction of the proximal end groove portion toward a distal end side of the housing.

4. The physical quantity detection device according to claim 3, wherein the intermediate groove portion has a groove width that is an even multiple of the groove widths of the proximal end groove portion and an outer edge groove portion.

5. The physical quantity detection device according to claim 3, wherein the intermediate groove portion has a groove width twice the groove widths of the proximal end groove portion and an outer edge groove portion.

6. The physical quantity detection device according to claim 2, wherein the first adhesive is an epoxy-based adhesive, and the second adhesive is a silicone-based adhesive.

7. A physical quantity detection device, comprising:
a housing that is inserted from a distal end side through an insertion hole of a main passage through which a measurement target gas flows and arranged in the main passage;
a cover that constitutes a sub-passage that takes in a part of the measurement target gas flowing through the main passage in cooperation with the housing;
a support body that is accommodated in the housing;
a sensor element that is supported by the support body and arranged in the sub-passage; and
a circuit board on which the support body is mounted,
wherein the housing includes:
a first adhesive groove that has a proximal end groove portion extending along a proximal end of the housing and a pair of groove portions extending from the proximal end groove portion to a distal end side of the housing with respect to a measurement unit of the sensor element, the first adhesive groove being provided with a first adhesive;
a circuit chamber that accommodates the circuit board; and
a second adhesive groove that is provided in the vicinity of the support body between the circuit chamber and the sub-passage, and provided with a second adhesive, and
the first adhesive has a Young's modulus higher than that of the second adhesive, and the second adhesive has a thixotropy higher than that of the first adhesive.

8. The physical quantity detection device according to claim 7, wherein a circuit component is mounted on the circuit board, and sealed with a silicone-based sealing member.

* * * * *